Feb. 4, 1969     J. H. RISEMAN     3,426,184
LOGARITHMIC CIRCUIT

Filed April 4, 1966

INVENTOR
JOHN H. RISEMAN
BY
Robert J. Schuller
ATTORNEY

United States Patent Office

3,426,184
Patented Feb. 4, 1969

3,426,184
LOGARITHMIC CIRCUIT
John H. Riseman, Cambridge, Mass., assignor to Orion Research, Inc., Cambridge, Mass., a corporation of Massachusetts
Filed Apr. 4, 1966, Ser. No. 547,121
U.S. Cl. 235—152                                  11 Claims
Int. Cl. G06f 1/02

ABSTRACT OF THE DISCLOSURE

A system for providing a digital or numerical output signal which approximates the antilog of an input logarithmic analog signal. Means are provided for deriving a pulse train having a number of pulses proportional to the magnitude of an input logarithmic analog signal. Other means are provided for raising an arbitrary digital numeral to an exponential power which is defined by the number of pulses in the pulse train, the resulting output product being substantially the digital antilogarithmic value of the input signal.

---

This invention relates to digital function generators, and more particularly to a digital electronic device for deriving a digital output signal which is substantially an antilogarithm of an input analog signal.

A number of known transducers provide an electrical output approximately logarithmically related to a phenomenon occurring at the transducer input. For example, the potential detected in electrochemical measurement by an electrode (such as the well-known ion-sensitive glass or silver-silver chloride electrodes and others) in equilibrium with ions in aqueous solution is a logarithmic function of the ion activity. This is expressed by the well-known Nernst equation $$E = \text{const.} + \frac{RT}{nF} \log A$$

where E is the detected potential, R is the gas constant, T is the absolute temperature, $n$ is an integer selected according to the valence charge of the ion detected, and A is the activity coefficient of ion.

Such logarithmic signals can be displayed on a logarithmically calibrated meter, or the antilog of the signal can be derived by a number of known means and displayed on a linear meter. The original signal is an analog signal and usually, the display device or function generator is also an analog device. Typically, if one desires to read the output over a number of decades, the display device is logarithmically calibrated and resolution is difficult where a number of decades is displayed.

A principal object of the present invention is therefore to provide a system for providing a digital or numerical output signal which approximates the antilog of an input logarithmic analog signal.

Another object of the present invention is to provide such a system which provides digital antilogarithmic values of the input signal substantially in real-time.

According to the principles of the present invention, means are provided for deriving a pulse train having a number of pulses proportional to the magnitude of an input analog signal, and means are further provided for raising an arbitrary digital numeral to an exponential power which is defined by the number of pulses in the pulse train, the resulting output product being substantially the digital antilogarithmic value of the input signal.

Other objects of the invention will in part be obvious and will in part appear hereinafter. The invention accordingly comprises the apparatus possessing the construction, combination of elements, and arrangement of parts which are exemplified in the following detailed disclosure.

For a fuller understanding of the nature and objects of the present invention, reference should be had to the following detailed description taken in connection with the accompanying drawings wherein.

Figure 1:
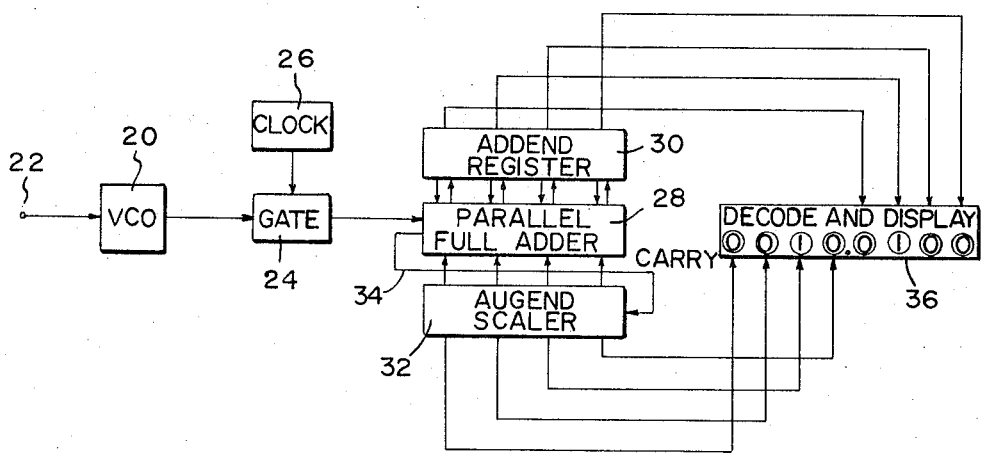
FIG. 1 is a schematic block diagram of a generalized embodiment of the present invention.

Referring now to FIG. 1, there is shown a simple device embodying the principles of the present invention and comprising means for digitizing an input analog signal. To this end, there is shown analog-to-digital converter means, for example, comprising voltage-controlled pulse generator or oscillator 20 having its control terminal 22 connectable to the input signal. As well known in the art, the output of oscillator 20 is a pulse train having a pulse repetition rate proportional to the magnitude of the input signal. The output of oscillator 20 is connected to an input of gate 24. The latter is controlled (i.e. enabled an disabled) by clock 26, the output of which is connected to the control input of the gate.

The device of FIG. 1 also includes means for raising an arbitrary digital number by an exponential number or power defined by the number of pulses gated in a given time interval by gate 24. Thus, there is shown digital parallel full adder 28 of the type which incorporates a chain of $n$ full adder stages. The adder is connected to an addend source or register 30 which, typically is formed of $n$ cascaded bistable stages and is therefore capable of storing a numeral of $n$ digits. The adder is also connected to an augend source or scaler 32 which, typically is a counter of $n$ cascaded bistable stages and is also capable of storing a numeral of $n$ digits. The adder stages are each connected in known manner to the corresponding stages of the scaler and the register for summing together, on command, the correspondingly significant digits of the numerical contents of both the scaler and register and for storing, the sum in the register. To effect addition, the command input of the adder is connected to the output of gate 24. A carry line 34 is connected from the carry-out terminal of the last (or most significant) digit stage of the adder to the input at the first (or least significant) stage of the scaler, so that when the register is full and spills, the output carry signal is applied to the scaler.

The output terminals of each of the stages of both the register and scaler are connected to a corresponding input terminal of decoder-display device 36 as will appear more fully hereinafter.

In describing the operation of the device of FIG. 1, it can be assumed that the input analog signal to be measured is a voltage, $E_{in}$, which expresses a logarithmic function i.e., $E_{in} = \log_b N$. Oscillator 20 is selected so that its pulse repetition rate varies by 1 pulse per unit time for a given increment of input voltage, and the gating pulse rate of clock 26 is set to establish that unit time. For example, one can assume that the clock has a 60 cycle pulse rate. The clock typically enables gate 24 only during positive half-cycles, hence the gate will pass pulses during each alternate $\frac{1}{120}$ second or for about 8.3 milliseconds. If, for example, for a 1 mv. input signal, oscillator 20 provides an output repetition rate of about 1.2 kc., the gate will provide a train of 10 pulses when enabled. Then, for each additional increment of 0.1 mv. in the input signal, the repetition rate of the oscillator increases by about 120 c.p.s. and the fixed gate interval will pass a pulse train one pulse greater.

Alternatively, to provide a pulse train having pulses in quantity proportional to the input signal one can employ a fixed oscillator frequency and a variable time gate controlled by the input signal.

The operation of the adder, register and scaler can be conveniently described in terms of binary counting although it is to be understood that the device is operable according to any of a number of arbitrary numerical system, depending on the nature of the circuitry selected. Adder then typically comprises a plurality of interconnected binary adding stages which for expository purposes can be considered a set of four. Similarly, both register and scaler are sets of four binary stages. It can be assumed that in the initial state, scaler 32 contains a preset numeral which for simplicity is preferably unity in any numerical system employed, i.e., 0001; similarly register 30 is in its zero condition, i.e., 0000. Both the register and scaler are connected to the parallel adder such that the latter can, on command add each digit of the numeral in the register to the correspondingly significant digit of the numeral in the scaler. When the addition is complete, the adder returns the sum to the register for storage and awaits the next command to add.

It should be noted that the number, 1, preset in the scaler is the antilogarithm of the input signal equivalent to zero regardless of the radix of the numerical system used. This is apparent from examination of the definition that the logarithm $x$ of a number N to the base $b$ is the exponent of the power to which $b$ must be raised to yield anti-logarithm N, i.e., $\log_b N = X$.

Where $X=0$, then N clearly is 1 for this is a basic property of logarithms.

Thus, a pulse train passed by gate 24 will provide serial command pulses to adder 28 and on the first pulse, the adder sums the register content 0000 with the scaler content 0001 to provide the numeral 0001 which is fed back to the register for storage. On the next command pulse, the scaler numeral 0001 is added to the register content to yield the numeral 0010. After the 15th command pulse, the total sum showed in the register will be 1111 and the register is therefore full. On the 16th pulse the register total added to the scaler numeral would sum as 10000, but because in this instance the register and adder have but four stages each, the adder spills and delivers the most significant digit of this sum as a carry pulse to the scaler. This changes the scaler state or numeral from 0001 to 0010, because the latter simply counts carry pulses. This register however, stores only the four last digits of the sum and hence is returned to its 0000 state.

Now the next command pulse causes the adder to total the binary numerals 0010 from the scaler and 0000 from the register, yielding the sum 0010. It will be apparent that the 23rd pulse will cause the register state to arrive at 1110. Thus, the 24th pulse, causing the numerals 1110 and 0010 to be summed, again creates a carry pulse from the adder to change the scaler state to 0011, and the remainder, or 0000 is returned to the register.

It can be assumed for simplicity that display device need only provide a binary display and therefore no decoding is necessary. Although those skilled in the art will be aware of a number of known circuits by which a binary set of signals can be decoded to provide a corresponding set of signals according to other radices. Display device 36 thus will have a numerical display of eight digits or indicia. Each stage of the register is connected to actuate a respective one of a block of four consecutive display digits in the same numerical order or significance as the significance of the stages of the register. The stages of the scaler are each connected to the display device so that the scaler stage representing the least significant digit in the scaler actuates the display digit corresponding to a digit of the next most numerical significance after the most significant digit of the register numeral, the other stages of the scaler being connected to respective digits of higher significance of the display device. The display device in this description will include for convenience a binary point between the two sets of four digits. Thus, for example, after the end of the 18th command pulse to the adder, the register content will be 0100 and the scaler content will be 0010. The display will thus read 0010.0100, the digits to the right of the binary point being derived in order from the register and those to the left of the binary point originating in order from the scaler.

On the average, the change in value of the numerical display resulting from an additional add-command pulse, should be substantially equal to the antilog of the incremental change in analog voltage causing the additional pulse.

For example, assume that the frequency of the oscillator and the timing interval of the gate are set so that for a voltage increment in $E_{in}$ of 0.02 mv., the pulse train increases by a unit pulse. Then if $E_{in}$ is 0.36 mv., the pulse train will contain 18 pulses. After the 18th pulse, the display will read, as noted in the FIG. 1, 0010.0100 which is decimal 2.25. The latter is the antilogarithm of the common logarithm .3522 which quite closely approximates the analog value of the input voltage, $E_{in}$.

In summary, it will be seen that the apparatus basically comprises means (exemplified by the oscillator, gate and clock) for digitizing an analog signal, and means (exemplified by the adder, register and scaler) for approximately multiplying an arbitrary numeral (e.g. 1.0001, the first sum of the scaler and register contents) by itself a number of times determined by the digital value of the analog signal, the digital product of the multiplication approximating the antilogarithm of the input analog signal.

Figure 2:
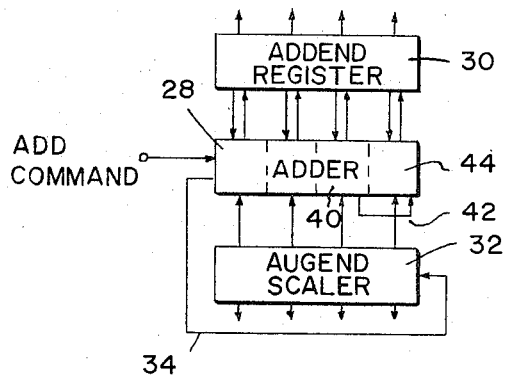
FIG. 2 is a schematic block diagram showing a portion of the embodiment of FIG. 1 in an alternative form.

The precision with which the invention approximates the antilogarithmic value improves with each additional stage used in the register (and correspondingly in the adder and scaler). The accuracy of computation is poorest at the lower end of the scale and can be improved. For example, as shown in FIG. 2, a "look-ahead" carry output of the next to least significant adder stage 40 is connected through feedback loop 42 to the carry input of the least significant stage 44 of the full adder. This type of feedback, as is well known in the art, forces the first two stages to operate on a count of three, rather than a count of four basis, and is quite similar to other systems such as the well-known device which, by virtue of feedback, forces four bistable stages to count in decades rather than in modulo-16. Thus, assuming initial conditions of register 30 and scaler 32 respectively of 0000 and 0001, the sum of each of a number of operations are as shown in the following table:

| Command pulse No.: | Sum |
|---|---|
| 1 | 0001 |
| 2 | 0010 |
| 3 | 0100 |
| 4 | 0101 |
| 5 | 0110 |
| 6 | 1000 |
| 7 | 1001 |
| 8 | 1010 |
| 9 | 1100 |
| 10 | 1101 |
| 11 | 1110 |
| 12 | 10000 |

From examination of the above it will be seen that the effect of in modulo-3 addition by the two least significant stages is to reduce the number of counts necessary to go from an output of decimal 1 to decimal 2 or from 0001.0000 to 0010.0000. Thus, the voltage increment/pulse necessarily must be adjusted, and for the example given will typically be about .024 mv.

In modulo-3 counting for the two least significant stages is intended to provide averaging of the incremental numerical changes at the low end of the scale because it will be apparent that when counting, say from 1.0 to 2.0 in logarithmic increments, the changes at the beginning of the count are much greater than the changes toward the end of the count. Actually, even more accuracy is obtainable by averaging with in modulo 2.5 counting, instead of in modulo-3 counting.

Figure 3:
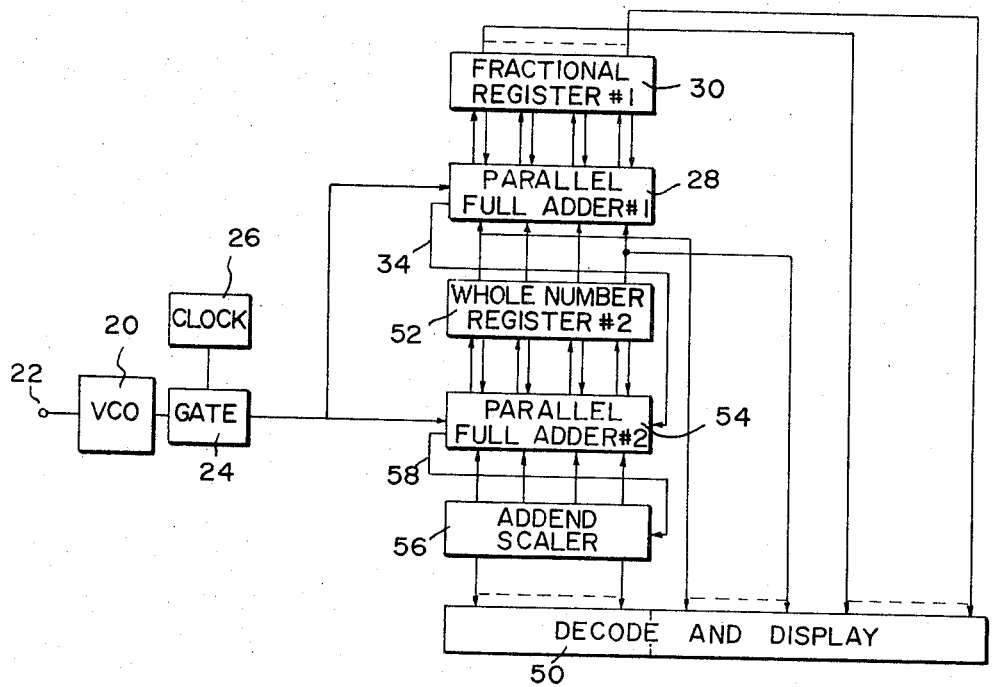
FIG. 3 is a schematic block diagram of yet another modification of the present invention.

In yet another modification, as shown in FIG. 3, more whole number digits can be provided. As is shown, the device of FIG. 3 comprises oscillator 20, clock 26 and gate 24 for providing a pulse train to the command input of first full adder 28. The latter has, for example, four full adder stages each connected as hereinbefore described to a corresponding one of four stages in first or fractional register 30. In turn, each stage of register 30 is connected to activate a corresponding digit of the least significant four digits of display 50, only two exemplary lines into display 50 being shown for simplicity in the drawing.

Each stage of adder 28, in turn is also connected to corresponding outputs of the four stages of second or whole number register 52. Each stage of register 52 is also connected to actuate a corresponding digit of the next most significant digits of display 50. It will be apparent that as thus described, the device of FIG. 3 is similar to the device of FIG. 1 except for the substitution of register 52 for scaler 32 and that in the example shown, decode-and-display device 50 has twelve digits for display rather than eight as shown in device 36 of FIG. 1. The device of FIG. 3 as thus far described operates in substantially the same manner as the device of FIG. 1.

However, the device of FIG. 3 also includes second full adder 54 having the same number of stages as first full adder 28. The carry input terminal of full adder 54 is connected by carry-line 34 from the nth order or most significant full-adder stage of adder 28. Full adder 54 is also connected to the output of gate 24 so as to operate to provide an additive operation responsively to each pulse from the gate. Each stage of adder 54 is connected both in input and output to corresponding stages of register 52 and in input from corresponding stages of scaler 56. Carry-line 58 is provided for connecting the 4th order adder stage of adder 54 to the 1st order stage of scaler 56. Each stage of scaler 56 is also connected in order of numerical significance to actuate corresponding ones of the four significant digits of display 50.

In operation, registers 30 and 52 act as augend and addend sources for adder 28, register 30 storing the sum of each operation of adder 28. Similarly scaler 56 and register 52 acts as augend and addend sources for adder 54, the sum of each operation of the latter being stored in register 52. Carries from adders 28 and 54, when they spill are respectively fed to the first order stages of adder 54 and scaler 56.

Now we can assume that both register 30 and register 52 have operated to reach a state where adder 54 provides a carry into scaler 56 and both registers are for convenience in description in their zero state. At this point, display 50 will read 00010000.0000, assuming that the binary point is provided on the display to give four binary fractional places. The next pulse from gate 20 will cause adder 54 to sum the contents of scaler 56 and register 52, providing the sum of 0001. Substantially simultaneously adder 28 adds the zero state of register 30 with the contents of register 52 to provide the sum 000. The latter is then stored back in register 30 and the sum from adder 54 is stored in register 52. At this point, the display will thus read 000100010000.

The next input command pulse will sum the contents of scaler 56 (0001) and register 52 (0001) providing a sum of 0010 while the contents of register 52 (0001) also serves as an addend being summed by adder 28 with the augend contents of register 30 (0000) to yield the sum 0001. Thus the display will change to read 000100100001.

Some add-command pulses later the scaler state will still be 0001, but the states of registers 52 and 30 are respectively 1111 and 0000 with a carry being applied by the output of adder 28 to the input of adder 54. The next pulse causes adder 54 to sum 0001 with 1111 and with the carry signal to provide 10000 which, overflowing adder 54, provides a carry pulse to scaler 56 changing the state of the latter to 0010.

Since certain changes may be made in the above processes and apparatus without departing from the scope of the invention herein involved, it is intended that all matter contained in the above description or shown in the accompanying drawings shall be interpreted in an illustrative and not in a limiting sense. For example, while the invention has been shown and described as operating in a purely binary mode, it will be apparent that it can readily be constructed by those skilled in the art to operate in other binary modes, such as binary-coded decimal and the like, and indeed according to any numerical system.

What is claimed is:

1. Apparatus for approximating the antilogarithm, in digital form, of an input logarithmically variable analog signal, said apparatus comprising in combination:
   means for periodically converting said analog signal to a pulse train having a plurality of pulses, said plurality being proportional in number to said input signal; and
   means for substantially multiplying an arbitrary digital numeral by itself a number of times responsively to said plurality of pulses.

2. Apparatus as defined in claim 1 wherein said means for converting comprises an oscillator having a periodic output and gating means adapted to be enabled and disabled for passing a portion of said periodic output.

3. Apparatus as defined in claim 2 including clock means for providing signals at fixed increments of time and connected to said gating means for enabling and disabling the latter in accordance with said signals;
   said oscillator being responsive to said analog signal for changing the frequency of said periodic output according to changes in said analog signal.

4. Apparatus as defined in claim 1 wherein said means for multiplying comprises a full adder of $n$ full adder stages each for adding digits of successive numerical significance, a first register of $n$ stages each connected to a corresponding stage of said adder, and a second register of $n$ stages each connected to a corresponding stage of said adder.

5. Apparatus as defined in claim 4 wherein said second register is a scaler, said apparatus including a carry signal line connected from the numerically most significant stage of said adder to the input of said scaler.

6. Apparatus as defined in claim 5 wherein said adder is connected to the output of said means for converting so as to add upon each pulse in said train an augend from said scaler with an addend from said register, and is connected to said register so as to store the sum of each addition in said register.

7. Apparatus as defined in claim 5 including display means connected to said means for multiplying for displaying at least a number which is the equivalent in value to the numeral stored in said scaler.

8. Apparatus as defined in claim 5 including display means for displaying a digital numeral of at least $2n$ digits;
   each stage of said register being connected to said display means for providing signals corresponding to respective ones of the group of the $n$ least significant of said digits according to the order of numerical significance of said register stages;
   each stage of said scaler being connected to said display means for providing signals corresponding to respective ones of the group of the $n$ most significant of said digits according to the order of numerical significance of said scaler stages.

9. Apparatus as defined in claim 1 wherein said means for multiplying comprises;

scaler means for counting digits in a predetermined code and having a plurality of $n$ cascaded stages each corresponding in order to the numerical significance of the digits of said code;

a register for storing a digital numeral in said code and having a plurality of $n$ cascaded stages each corresponding in order to the numerical significance of the digits of said numeral; and a parallel full adder connected to said register so that the latter can provide an augend to said adder, and connected to said scaler so that scaler can provide an addend to said adder, the register also being connected to said adder so as to store the sum provided by each operation of said adder, said adder having a plurality of $n$ full adder stages each connected to a stage in the register and a stage in the scaler of the same numerical significance.

10. Apparatus as defined in claim 8 wherein the least two significant full-adder stages are connected for adding in modulo greater than 2.

11. Apparatus as defined in claim 1 wherein said means for multiplying comprises scaler means for counting digits in a predetermined code and having a plurality of $n$ cascaded stages each corresponding in order to the numerical significance of the digits of said code; a first register and a second register each for storing a respective digital numeral in said code and each having a plurality of $n$ stages each corresponding in order to the numerical significance of the digits of said respective numeral;

a first parallel full adder connected to said first register so that the latter can provide its respective numeral as an augend to said adder, and connected to said second register so that the latter can provide its respective numeral as addend to said adder;

said first register also being connected to said first adder so as to store the sum provided by each operation of said adder;

said first adder having $n$ full-adder stages each connected to a stage in said first register and a stage in said second register of corresponding numerical significance;

a second parallel full adder connected to said second register so that the latter can provide its respective numeral as an augend to said second adder, and connected to said scaler means so that the latter can provide the numerical count therein to said second adder as an addend;

said second adder having $n$ full adder stages each connected to a stage in said scaler means and said second register of corresponding numerical significance;

a first carry signal line connected from the numerically most significant stage of said first adder to the lowest order stage of said second adder, and a second carry signal line connected from the numerically most significant stage of said second adder to the input of said scaler means.

References Cited

UNITED STATES PATENTS 3,062,445  11/1962  Kassel _____ 235—160

MALCOLM A. MORRISON, *Primary Examiner.*

E. G. BOTZ, *Assistant Examiner.*

U.S. Cl. X.R.

235—156, 151.31, 175